(12) United States Patent
Mohammed et al.

(10) Patent No.: US 6,173,344 B1
(45) Date of Patent: Jan. 9, 2001

(54) SCSI BUS TRANSCEIVER AND METHOD FOR MAKING THE SAME

(75) Inventors: Abdul Waheed Mohammed, Sunnyvale; Peter K. Cheung, Milpitas; Barry Davis, Union City; Christopher Burns, San Jose, all of CA (US)

(73) Assignee: Adaptec, Inc, Milpitas, CA (US)

( * ) Notice: Under 35 U.S.C. 154(b), the term of this patent shall be extended for 0 days.

(21) Appl. No.: 09/085,671

(22) Filed: May 27, 1998

(51) Int. Cl.[7] ..................................................... G06F 13/00
(52) U.S. Cl. .................................. 710/62; 710/63; 711/167
(58) Field of Search ................................ 712/1; 711/167; 710/60, 58, 62, 63, 29, 131

(56) References Cited

U.S. PATENT DOCUMENTS

| 5,535,336 |   | 7/1996 | Smith et al. | 395/200.06 |
| 5,611,057 | * | 3/1997 | Pecone | 710/102 |
| 5,706,447 |   | 1/1998 | Vivio | 395/309 |
| 5,751,977 |   | 5/1998 | Alexander | 395/306 |
| 5,790,775 | * | 8/1998 | Marks | 714/9 |
| 5,925,120 | * | 7/1999 | Arp | 710/131 |
| 5,953,540 | * | 9/1999 | Raymond | 710/62 |

OTHER PUBLICATIONS

Unknown, "ASUS PCI–DA2100 PCI to SCSI Disk Array Controller", User's Manual Hardware Installation, Rev. 1.22, Nov. 1996, ASUSTek Computer, Inc.

Unknown, "ASUS P2L97–S Pentium II Motherboard", User's Manual, Rev. 1.05, Sep. 1997, ASUSTek Computer, Inc.

Unknown, "ASUS P2L97 Pentium II Motherboard", User's Manual, Rev. 1.05, Sep. 1997, ASUSTek Computer, Inc.

* cited by examiner

Primary Examiner—Eric Coleman
(74) Attorney, Agent, or Firm—Martine Penilla & Kim, LLP (57) ABSTRACT

Disclosed is a SCSI host adapter for use in a computer system. The SCSI host adapter is configured to provide the computer system with interconnection with internal and/or external target devices. The SCSI host adapter includes a low voltage differential connector for interconnecting to a low voltage differential bus, and the low voltage differential bus is configured to communicate a first transaction. The SCSI host adapter also includes a single ended connector for interconnecting to a single ended bus, and the single ended bus is configured to communicate a second transaction. Furthermore, the SCSI host adapter includes a transceiver unit that is configured to interface between the low voltage differential bus and the single ended bus and produce a target information signal. The target information signal is configured to indicate whether the first transaction or the second transaction is occurring between the SCSI host adapter and the low voltage differential bus or the single ended bus.

26 Claims, 6 Drawing Sheets

| Target Device ID # | Bus Type | Target Device Type |
|---|---|---|
| 1 | Ultra2 | Ultra ✶ |
| 3 | Ultra2 | Ultra2 |
| 7 | Ultra | Ultra |
| 9 | Ultra2 | Ultra2 |

| Target Device ID # | Bus Type | Target Device Type |
|---|---|---|
| 1 | Ultra | Ultra |
| 3 | Ultra2 | Ultra2 |
| 7 | Ultra | Ultra |
| 9 | Ultra2 | Ultra2 |

FIG. 6B

SCSI BUS TRANSCEIVER AND METHOD FOR MAKING THE SAME

BACKGROUND OF THE INVENTION

1. Field of the Invention

This invention relates generally to computer adapter cards, and more particularly to computer adapter cards that are capable of interconnecting data buses having target peripheral devices to a host computer system.

2. Description of the Related Art

As the power of applications, processors, and storage devices increase, high-end computer users are seeking ways to optimize their computer systems to achieve the highest level of performance. For example, most of today's computer systems are highly modular systems that enable them to be modified and equipped with just the right software and hardware. Typically, a computer's mother board includes several peripheral component interconnect (PCI) slots that are configured to receive adapter cards, such as SCSI adapter cards. These SCSI adapter cards act as a reliable and efficient interface between the host computer and any number of peripheral devices. In general, once a SCSI adapter card is inserted into the host computer's PCI slot, a SCSI bus (typically in the form of a ribbon cable) is used to interconnect one or more peripheral devices (also known as target devices) to the SCSI host adapter.

Figure 1A:
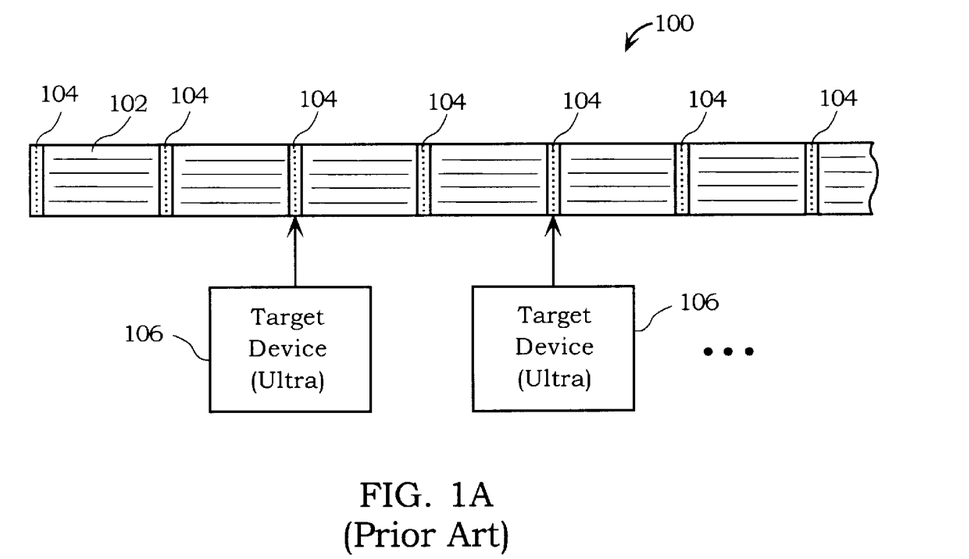
FIG. 1A is an example of an Ultra bus single ended system that includes a cable and several connectors.

In recent years, there have been many improvements to the SCSI bus technology which has lead to the development of several different types of SCSI buses, each having their own performance characteristics. For ease of discussion, FIG. 1A is an example of an Ultra bus system 100, which is in the form of a cable 102 that includes several connectors 104. The Ultra bus system 100 typically has seven (7) connectors 104 which are 50 pin connectors, and the cable 102 is capable of communicating data at speeds up to about 20 Megabytes/second, for 8-bit devices. Alternatively, if the cable 102 is an Ultra Wide bus, the Ultra bus system 100 will be capable of communicating data at speeds up to about 40 Megabytes/second, for 16-bit devices. Also, Ultra Wide buses typically have fifteen (15) connectors 104 having 68 pins. Accordingly, the Ultra bus system 100 is capable of interconnecting either up to 7 or up to 15 target devices 106, in a parallel arrangement, to the SCSI host adapter. Thus, depending on whether the Ultra bus system 100 has an Ultra or Ultra Wide bus, it will be capable of supporting data transfer rates up to 20 or 40 Megabytes/second.

Figure 1B:
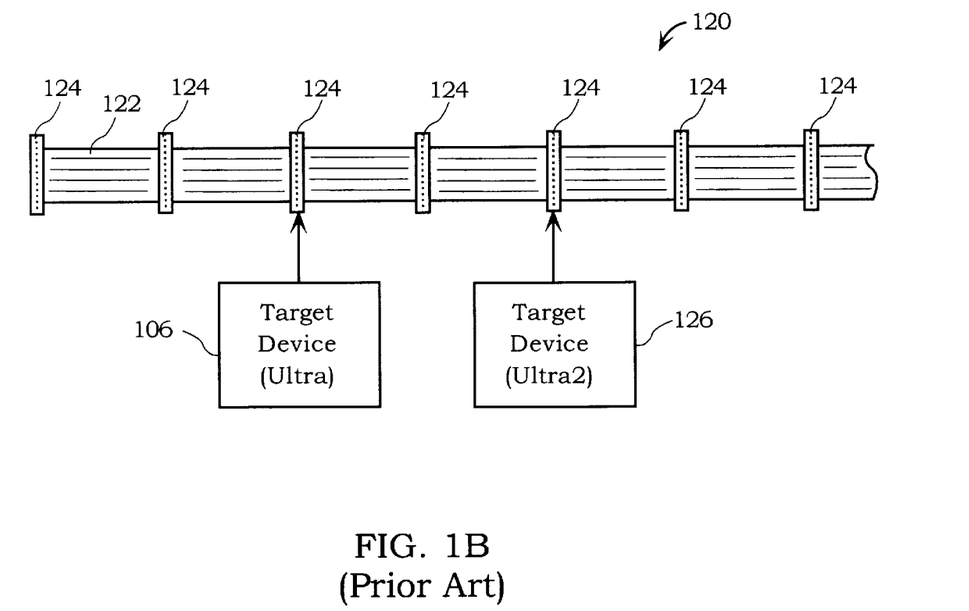
FIG. 1B illustrates an Ultra2 bus system having a low voltage differential (LVD) cable and associated 68 pin connectors.

FIG. 1B illustrates an Ultra2 bus system 120 having a low voltage differential (LVD) cable 122 and respective 68 pin connectors 124. In general, the LVD cable 122 of the Ultra2 bus system 120 is known to be a lower power consuming system than the Ultra bus system 100, and provides the ability to drive cable lengths up to 12 meters or more. This is substantial when compared to the Ultra bus system 100, which can only typically drive cable lengths of about 3 meters. Most significantly, the Ultra2 bus system 120 is capable of running at data transmission speeds up to about 80 Megabytes/second, for 16-bit Ultra2 devices. As can be appreciated, higher performance systems will typically want to take advantage of the high data transmission speeds by incorporating Ultra2 bus systems 120 into there computer system. To fully take advantage of the increased data transmission speeds offered by the Ultra2 bus system 120, Ultra2 target devices 126 should be connected to the connectors 124. Unfortunately, when older Ultra target devices 106 are connected to the Ultra2 bus system 120, the transmission speeds for all other devices on the bus, including the Ultra2 target device 126, will suffer a substantial reduction in speed, which is typically about half or more.

For example, assume that the Ultra2 target device 126 was enjoying a transmission rate of about 80 Megabytes/second along the Ultra2 bus system 120 before the Ultra target device 106 was connected to the bus. After the Ultra target device 106 is connected to the bus, the transmission rate for all target devices (Ultra2 and non-Ultra2 devices) connected to the bus will not be more than the transmission rate of the Ultra target device 106. Therefore, if the Ultra target device 106 is an Ultra Wide device that is capable of running at 40 Megabytes/second, then the fastest the Ultra2 target device 126 can run is 40 Megabytes/second. This is true even though both the LVD cable 122 and the Ultra2 target device 126 is capable of running at speeds up to about 80 Megabytes/second.

Accordingly, if a user desires to install an LVD cable 122 to interconnect the SCSI host adapter to peripheral devices, such as, hard drives, CD-ROMs, DVD drives, tape drives, and the like, the user will also have to replace all non-Ultra2 peripheral devices to take advantage of the higher speeds offered by an Ultra2 bus system. As can be appreciated, the replacement of all peripheral devices can be a costly solution, considering that only selected speed sensitive peripheral devices need to run at the Ultra2 speeds. Furthermore, being that SCSI Ultra bus is a more established technology, there is a greater likelihood that a majority of the peripheral devices that are currently installed in existing computer systems will be Ultra target devices. As such, many users that desire the improved data transmission speeds of Ultra2 target devices will decide not to install an Ultra2 bus and an Ultra2 peripheral device because, if older Ultra target devices are connected to the Ultra2 bus, the faster transmission rates of the SCSI Ultra2 will not be realized.

In view of the foregoing, there is a need for a SCSI technology adapter that enables use of both Ultra and Ultra2 target devices without reducing the data transmission rates of the faster Ultra2 target devices.

SUMMARY OF THE INVENTION

Broadly speaking, the present invention fills these needs by providing a SCSI host adapter that is capable of coupling to both a SCSI Ultra2 bus and a SCSI Ultra bus, and is capable of maintaining higher performance levels of Ultra2 target devices even when Ultra target devices are connected to the same SCSI host adapter. Also disclosed are method for making a SCSI host adapter having a transceiver unit for enabling operation of both SCSI Ultra2 and SCSI Ultra target devices, without negatively impacting on the high performance characteristics of SCSI Ultra2 devices. It should be appreciated that the present invention can be implemented in numerous ways, including as a process, an apparatus, a system, a device, a method, or a computer readable medium. Several inventive embodiments of the present invention are described below.

In one embodiment, a SCSI host adapter is disclosed. The SCSI host adapter includes a first connector for connecting the SCSI host adapter to a first bus, and a second connector for connecting the SCSI host adapter to a second bus. The SCSI host adapter also includes a transceiver unit that is in communication between the first bus and the second bus. The transceiver unit is configured to electrically isolate the first bus from the second bus so as to enable a maximum burst rate for target devices that are connected to each of the first bus and the second bus. In this embodiment, the transceiver unit is configured to produce a target information signal that identifies whether a data transfer operation is being executed between the first bus and the SCSI host adapter or between the second bus and the SCSI host adapter.

In another embodiment, a host adapter for use in a computer system is disclosed. The host adapter is configured to provide the computer system with interconnection with internal and external target devices. The host adapter includes a low voltage differential connector for interconnecting to a low voltage differential bus, and the low voltage differential bus is configured to communicate a first transaction. The host adapter also includes a single ended connector for interconnecting to a single ended bus, and the single ended bus is configured to communicate a second transaction. Furthermore, the host adapter includes a transceiver unit that is configured to interface between the low voltage differential bus and the single ended bus and produce a target information signal. The target information signal is configured to indicate whether the first transaction or the second transaction is occurring between the host adapter and the low voltage differential bus or the single ended bus.

In yet a further embodiment, a method for making a host adapter on a printed circuit board is disclosed. The method includes: (a) integrating a low voltage differential connector onto the printed circuit board; (b) integrating a single ended connector onto the printed circuit board; and (c) mounting a transceiver unit onto the printed circuit board. The transceiver unit is configured to electrically isolate the low voltage differential connector from the single ended connector, and is further configured to produce a target information signal that is indicative of transmission activity through one of the low voltage differential connector and the single ended connector.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for a method for making a SCSI host adapter and a SCSI host adapter that is capable of coupling both a SCSI Ultra2 bus and a SCSI Ultra bus to a single computer system, and is capable of maintaining higher performance levels for Ultra2 target devices even when Ultra target devices are connected to the SCSI host adapter. It will be obvious, however, to one skilled in the art, that the present invention may be practiced without some or all of these specific details. In other instances, well known process operations have not been described in detail in order not to unnecessarily obscure the present invention.

Figure 2:
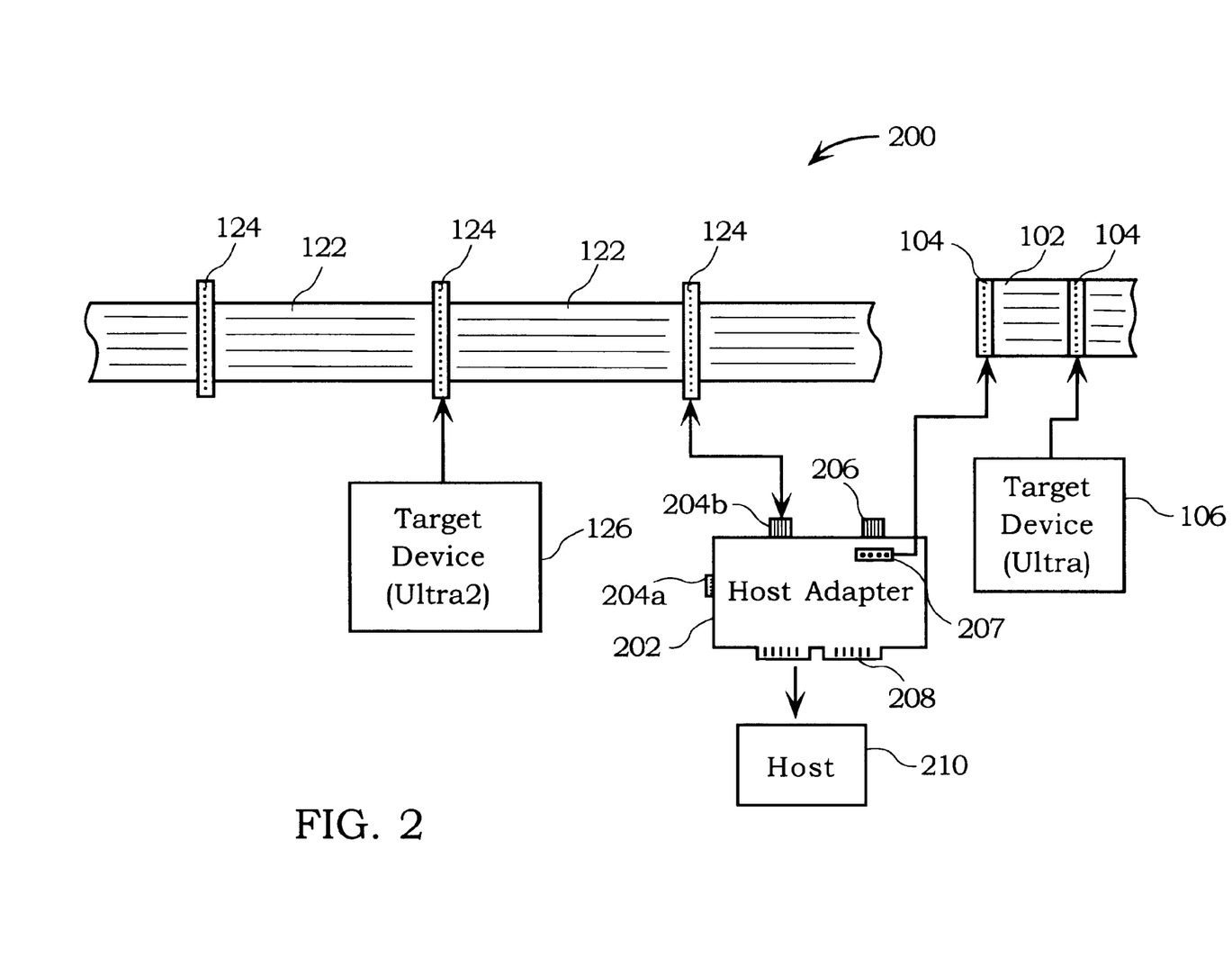
FIG. 2 shows a SCSI system including a host adapter that can be connected to both an Ultra2 LVD bus and an Ultra bus in accordance with one embodiment of the present invention.

FIG. 2 shows a SCSI system 200 including a host adapter 202 that can be connected to both an Ultra2 bus having a cable 122 and connectors 124 and an Ultra bus having a cable 102 and connectors 104, in accordance with one embodiment of the present invention. In this example, the host adapter 202 includes an internal Ultra2-LVD/SE connector 204b, and an external Ultra2-LVD/SE connector 204a that will provide SCSI Ultra2 access to external target devices (i.e., outside of a computer system's housing). The connectors 204a and 204b are used to connect up to the low voltage differential (LVD) buses, however, single ended (SE) devices may also be connected to the connectors 204a and 204b. The internal Ultra2-LVD/SE connector 204b may then be coupled to one of the connectors 124 of the Ultra2 bus.

The host adapter 202 also includes an Ultra Wide (single ended "SE") connector 206 (that is a 68 pin connector) and an Ultra SE connector 207 (that is a 50 pin connector). Accordingly, if the Ultra bus were an Ultra Wide bus having 68 pin connectors, the Ultra Wide bus would be connected to the host adapter 202 through the Ultra Wide connector 206. However, in this example, the Ultra bus has 50 pin connectors 104, and therefore, the host adapter 202 can be connected to the Ultra bus via the Ultra connector 207. In either case, the host adapter 202 is capable of being connected to both an Ultra2 bus having Ultra2 target devices 126 and a single ended Ultra bus having Ultra target devices 106. The host adapter 202 also preferably has a PCI connector 208, which enables the host adapter 202 to be easily inserted into a mother board of a host 210.

Figure 3:
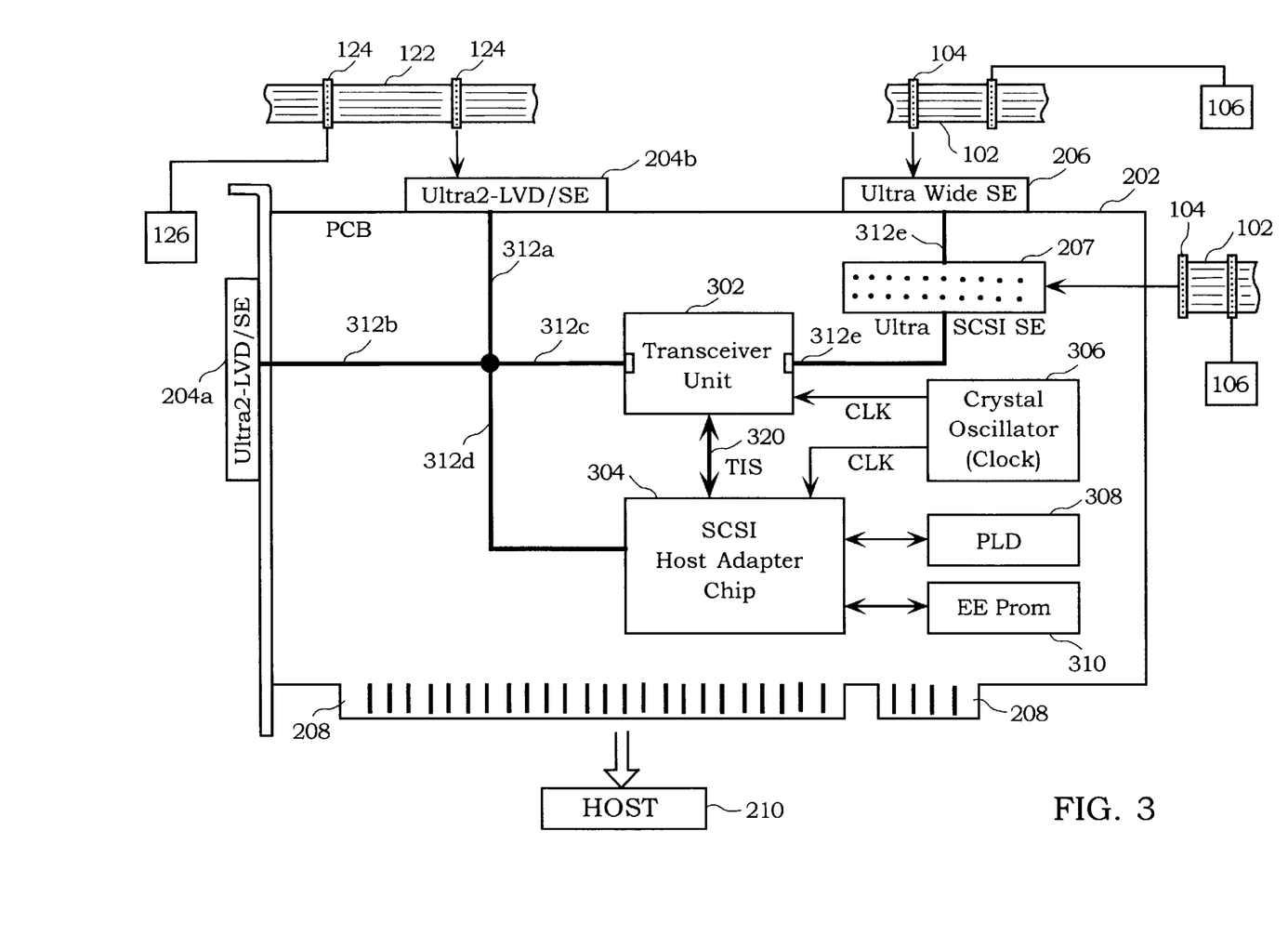
FIG. 3 shows a more detailed illustration of the architecture of the host adapter of FIG. 2 in accordance with one embodiment of the present invention.

Reference is now drawn to FIG. 3, in which a more detailed view of the architecture of the host adapter 202 is provided in accordance with one embodiment of the present invention. As mentioned above, the host adapter 202 includes the external Ultra2-LVD/SE connector 204a for interconnecting to external SCSI peripheral devices, and the internal Ultra2-LVD/SE connector 204b for interconnecting to an Ultra2 bus, which is shown having an LVD cable 122 and 68 pin connectors 124. The host adapter 202 also includes the internal 68 pin Ultra Wide connector 206 and the internal 50 pin Ultra connector 207. By providing both the Ultra Wide connector 206 and the Ultra connector 207, the host adapter provides a high level of flexibility for use with different connector configurations.

In this embodiment therefore, a user will be able to connect both an Ultra bus and an Ultra2 bus to the same host adapter 202, however, the high performance characteristics of the Ultra2 bus and Ultra2 target devices will not be detrimentally affected when non-Ultra2 target devices are connected through the Ultra or Ultra Wide buses (i.e., having cable 102 and connectors 104). The protection provided to the Ultra2 bus and Ultra2 target devices is a result of electrically isolating the Ultra bus from the Ultra2 bus during their respective operation. As shown in FIG. 3, a transceiver unit 302 is strategically connected between an internal SCSI bus segment (i.e., 312e) for Ultra target devices and an internal SCSI bus segment (i.e., 312a, 312b, 312c, and 312d) for Ultra2 target devices.

Preferably, the transceiver unit 302 is coupled to the internal SCSI bus segment 312c, which is in turn coupled to the internal SCSI bus segment 312a that is coupled to the internal Ultra2-LVD/SE connector 204b. The internal SCSI bus segment 312a is also coupled to the external Ultra2-LVD/SE connector 204a through the internal SCSI bus segment 312b. Furthermore, the transceiver unit 302 is also coupled to a SCSI host adapter chip 304 through the internal SCSI bus segments 312c and 312d. In this embodiment, the SCSI host adapter chip is a ACI-7890A packaged semiconductor device, which is available from Adaptec Inc., of Milpitas, Calif.

The transceiver unit 302 is also coupled to the Ultra bus through the internal SCSI bus 312e. In this example, both a 50 pin Ultra SCSI/SE connector 207 and an Ultra Wide connector 206 are provided, however, either one may be omitted depending on the desired application. Accordingly, either one or both of the Ultra Wide connector 206 and the Ultra connector 207 may be used to connect to the Ultra bus cables 102 and connectors 104.

The host adapter 202 also includes a crystal oscillator (clock) 306 which is configured to provide the appropriate clock "CLK" timing to both the transceiver unit 302 and the SCSI host adapter chip 304. Also included is a standard programmable logic device (PLD) 308, which is programmed with the identification codes "IDs" to operate as an initiator, as opposed to a terminator. The host adapter 202 also has a EEPROM 310 memory device, which is configured to store the initialization code that will be used during the host computer's boot-up process.

As shown, the transceiver unit 302 is in communication with the SCSI host adapter chip 304 via a target information signal (TIS) line 320, in accordance with one embodiment of the present invention. As mentioned above, the transceiver unit 302 is capable of isolating the Ultra2 bus from the Ultra bus when processing a data transfer in accordance with the SCSI Ultra2 protocol, and respectively isolating the Ultra bus from the Ultra2 bus when processing a data transfer in accordance with the SCSI Ultra2 protocol.

Figure 4:
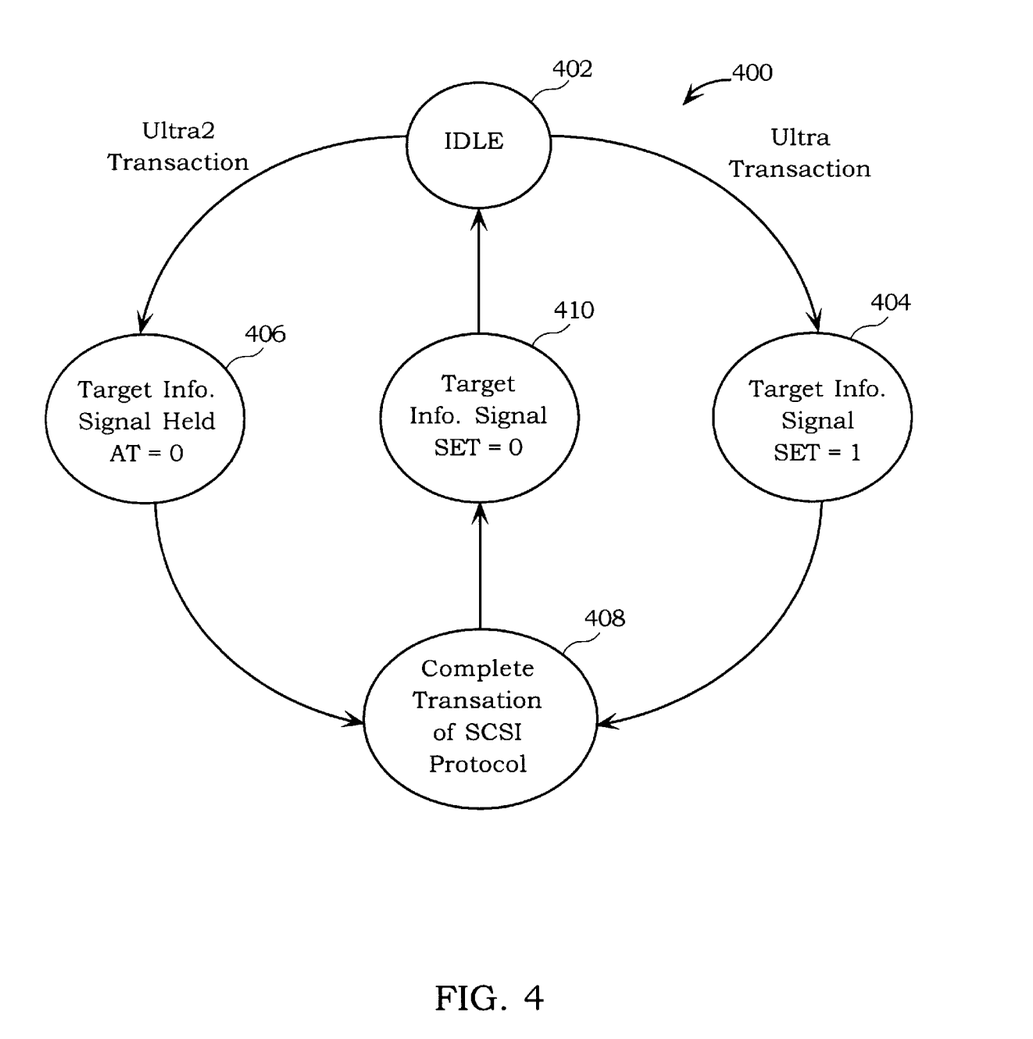
FIG. 4 is a state machine diagram illustrating the functionality of a transceiver unit in accordance with one embodiment of the present invention.

To further elaborate on the functionality of the transceiver unit 302, reference is made to a state machine diagram 400 of FIG. 4, in accordance with one embodiment of the present invention. When the transceiver unit 302 is in an idle state 402, the state machine 400 will be set to a logical state zero (0), which is communicated via the TIS line 320 to the SCSI host adapter chip 304. Upon the utilization of the Ultra2 bus, either through the Ultra2-LVD/SE connector 204b or the Ultra2-LVD/SE connector 204a, the internal SCSI bus lines 312a, 312b and 312d will be utilized to communicate with the SCSI host adapter chip 304, which in turn communicates with the host 210 via the PCI connector 208.

Therefore, during an Ultra2 transaction, the state machine 400 will proceed to a state 406. In state 406, the target information signal (TIS) is held at a logical state zero (0), and the state machine proceeds to a state 408 where the transaction of the current SCSI protocol is complete. Once complete, the state machine 400 will move to a state 410 in which the TIS is set to a logical state zero (0). However, because the Ultra2 transaction maintains the TIS signal 320 that is transferred from the transceiver unit 302 to the SCSI host adapter chip 304 at a logical state zero (0), the state 410 will not change the state of the TIS signal 320.

After the Ultra2 transaction is complete, the state machine 400 will return to the idle state 402. Once at the idle state 402, a next transaction, which could be an Ultra transaction may begin. When an Ultra transaction begins, the internal SCSI bus 312e will be used to communicate between one of the Ultra Wide connector 206 and the Ultra connector 207 and the transceiver unit 302. At the point the transceiver unit 302 receives the Ultra signal over the internal SCSI bus 312e, the state machine 400 will move from the idle state 402 to a state 404. In state 404, the TIS signal 320 is set to a logical state one (1) and passed to the SCSI host adapter chip 304. Next, the state machine 400 will move to the state 408 where the SCSI Ultra transaction protocol is processed to completion. In this embodiment, the Ultra signal is processed by being passed through the transceiver unit 302, onto the internal SCSI buses 312c and 312d, and to the SCSI host adapter chip 304 for processing. At that point, the data can be communicated to the host 210.

Figure 5:
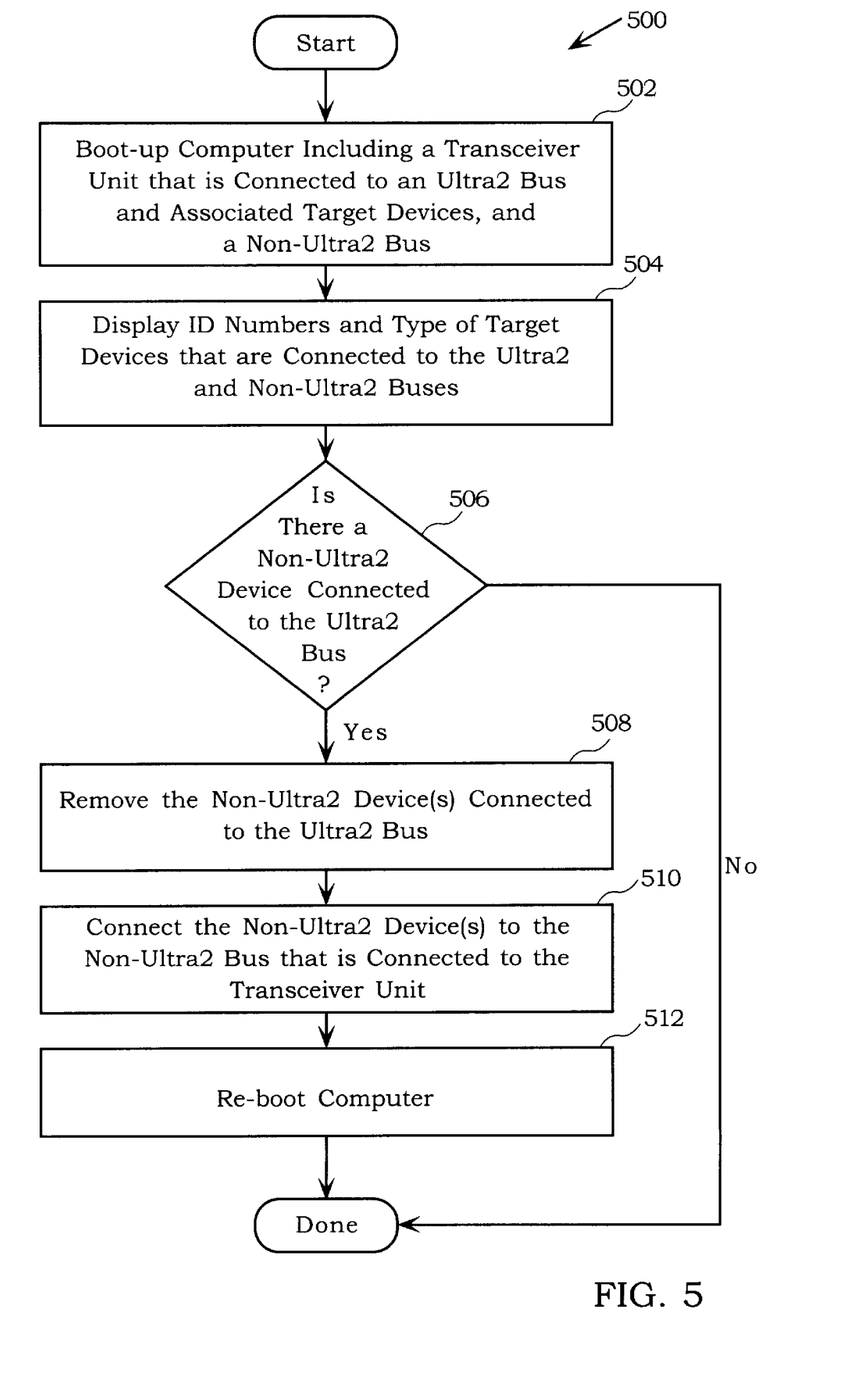
FIG. 5 is flowchart diagram illustrating one exemplary method for configuring a computer system that includes a host adapter having connectors to both an Ultra2 bus and a non-Ultra2 bus, in accordance with one embodiment of the present invention.

FIG. 5 is flowchart diagram 500 illustrating one exemplary method for configuring a computer system that includes a host adapter having connectors to both an Ultra2 bus and a non-Ultra2 bus, in accordance with one embodiment of the present invention. The method begins at an operation 502, where a computer system that has a host adapter that includes a transceiver unit is booted up. In this embodiment, the transceiver unit is preferably connected to both an Ultra2 bus and a non-Ultra2 (i.e., single ended Ultra) bus, which have target devices connected to the respective buses. During the boot-up process, the SCSI host adapter chip 304 will scan the SCSI buses to detect all of the target devices that may be connected to the respective buses. From operation 502, the method will proceed to an operation 504 where the ID numbers and the type of target devices that are connected to the Ultra2 and the non-Ultra2 buses are displayed to the user.

Figure 6A:
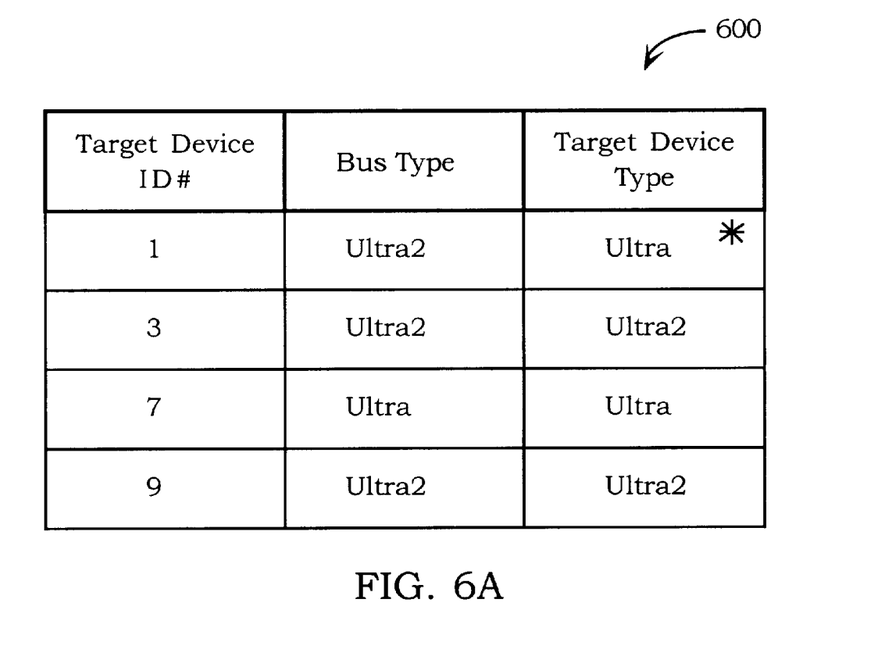
FIGS. 6A–6B illustrate tables that identify the target devices that are connected to each of the buses during boot-up in accordance with one embodiment of the present invention.
Figure 6B:
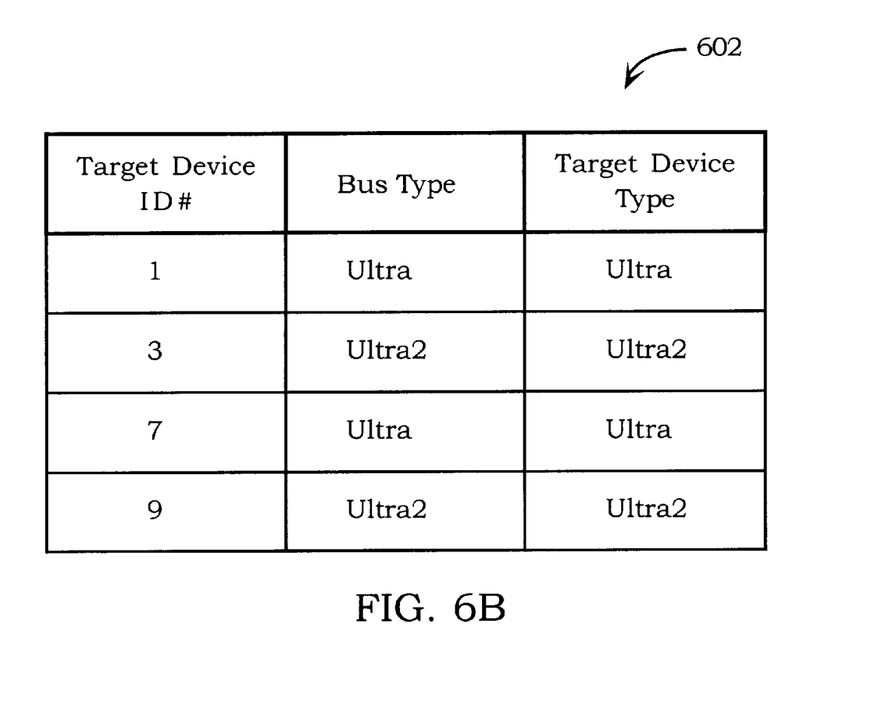

To illustrate the boot-up and display process in greater detail, reference is made to FIGS. 6A and 6B. In table 600, an exemplary case in which two Ultra2 target devices having ID numbers "3" and "9", and one Ultra target device "*" having ID number "1" are connected to an Ultra2 bus. Also shown is an Ultra target device having ID number "7" that is connected to an Ultra bus. By examining the table 600, it is evident that the boot-up process has detected that the Ultra target device having ID number "1" is connected to the Ultra2 bus. As discussed above, this connection configuration will have the detrimental effect of substantially reducing the maximum SCSI bust rate (i.e., speed) of all of the Ultra2 target devices that are connected to the Ultra2 bus.

Reference is now drawn back to FIG. 5, where the method proceeds to a decision operation 506. In decision operation 506, it is determined whether there is a non-Ultra2 device connected to the Ultra2 bus. As illustrated in the example case of FIG. 6A, a non-Ultra2 target device (i.e., Ultra target device having ID number "1") is connect to the Ultra2 bus. At this point, the method proceeds to an operation 508, where the non-Ultra2 target device is removed from the Ultra2 bus. Once removed, the method proceeds to an operation 510 where the non-Ultra2 target device is connected to the non-Ultra2 bus (i.e., Ultra bus), which is connected to the transceiver unit. Now that the target devices have been connected in an optimum orientation on either side of the isolating transceiver unit, the method will proceed to an operation 512. In operation 512, the computer system is re-booted, and the host adapter will scan all of the buses to identify all of the target devices and the buses to which they are connected.

As shown in FIG. 6B, after the computer is re-booted, all of the target devices are connected to their respective buses as shown in table 602. That, the Ultra target device having ID number "1" is now connected to the Ultra bus, which advantageously avoids hampering the performance of any of the devices that may be connected to the Ultra2 bus.

The present invention may be implemented using any type of integrated circuit logic, state machines, or software driven computer-implemented operations. By way of example, a hardware description language (HDL) based design and synthesis program may be used to design the silicon-level circuitry necessary to appropriately perform the data and control operations in accordance with one embodiment of the present invention. By way of example, a VHDL® hardware description language available from IEEE of New York, N.Y. may be used to design an appropriate silicon-level layout.

The invention may employ various computer-implemented operations involving data stored in computer systems to drive computer peripheral devices (i.e., in the form of software drivers). These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A SCSI host adapter, comprising:
a first connector for connecting the SCSI host adapter to a first bus haying a first burst rate;
a second connector for connecting the SCSI host adapter to a second bus having a second burst rate that is lower than the first burst rate; and
a transceiver unit being in communication between the first bus and the second bus, the transceiver unit being configured to electrically isolate the first bus from the second bus so as to enable a maximum burst rate for target devices that are connected to each of the first bus and the second bus, the transceiver unit being configured to prevent the second burst rate from downwardly impacting the first burst rate of the first bus.

2. A SCSI host adapter as recited in claim 1, wherein the transceiver unit is configured to produce a target information signal that identifies whether a data transfer operation is being executed between the first bus and the SCSI host adapter or between the second bus and the SCSI host adapter.

3. A SCSI host adapter as recited in claim 1, wherein the first connector and the first bus are of a SCSI ultra2 type.

4. A SCSI host adapter as recited in claim 3, wherein the second connector and the second bus are of a SCSI ultra type.

5. A SCSI host adapter as recited in claim 2, wherein the target information signal is set to a logical zero when the a target device connected to the first bus is processing a SCSI transaction.

6. A SCSI host adapter as recited in claim 2, wherein the target information signal is set to a logical one when the a target device connected to the second bus is processing a SCSI transaction.

7. A SCSI host adapter as recited in claim 5, further comprising a host adapter chip that is configured to receive and process data between the first bus and a computer CPU when the target information signal is set to the logical zero.

8. A SCSI host adapter as recited in claim 6, further comprising a host adapter chip that is configured to receive and process data between the second bus and a computer CPU when the target information signal is set to the logical one.

9. A SCSI host adapter as recited in claim 4, wherein the SCSI host adapter includes:
an ultra2 connector for connecting to the first bus; and
one of an ultra wide connector for connecting to the second bus, and an ultra connector for connecting to the second bus.

10. A SCSI host adapter as recited in claim 9, further comprising:
a crystal oscillator for providing a clock signal to the transceiver unit;
a programmable logic device; and
a memory device for storing boot-up operating code.

11. A SCSI host adapter as recited in claim 2, wherein the transceiver chip includes a state machine that is configured to set the target information signal that is produced by the transceiver chip.

12. A host adapter for use in a computer system, the host adapter being configured to provide the computer system with interconnection with internal and/or external target devices, comprising:
a low voltage differential connector for interconnecting to a low voltage differential bus, the low voltage differential bus being configured to communicate a first transaction at a first burst rate;
a single ended connector for interconnecting to a single ended bus, the single ended bus being configured to communicate a second transaction at a second burst rate that is lower than the first burst rate; and
a transceiver unit being configured to interface between the low voltage differential bus and the single ended bus and produce a target information signal that is indicative of whether the first transaction or the second transaction is occurring between the host adapter and the low voltage differential bus or the single ended bus, the transceiver unit being configured to prevent the second burst rate from downwardly impacting the first burst rate of the low voltage differential connector.

13. A host adapter for use in a computer system as recited in claim 12, wherein the transceiver unit includes a state machine that is configured to produce a logical zero when the first transaction is occurring between the host adapter and the low voltage differential bus.

14. A host adapter for use in a computer system as recited in claim 12, wherein the transceiver unit includes a state machine that is configured to produce a logical one when the second transaction is occurring between the host adapter and the single ended bus.

15. A host adapter for use in a computer system as recited in claim 12, further comprising:

an Ultra2 target device being connected to the low power differential bus and capable of operating at a first rate, and an Ultra target device being connected to the single ended bus and capable of operating at a second rate that is slower that the first rate.

16. A host adapter for use in a computer system as recited in claim 15, wherein the low power differential bus is a SCSI Ultra2 bus and the single ended bus is one of a SCSI Ultra bus and a SCSI Ultra Wide bus.

17. A host adapter for use in a computer system as recited in claim 12, further including a PCI connector for communicating between the computer system and the host adapter.

18. A host adapter for use in a computer system as recited in claim 12, further comprising:

a crystal oscillator for providing a clock signal to the transceiver unit;

a programmable logic device; and a memory device for storing boot-up operating code.

19. A method for making a host adapter on a printed circuit board, comprising:

integrating a low voltage differential connector onto the printed circuit board, the low voltage differential connector being configured to have a first burst rate;

integrating a single ended connector onto the printed circuit board, the single ended connector being configured to have second burst rate that is lower than the first burst rate;

mounting a transceiver unit onto the printed circuit board, such that the transceiver unit electrically isolates the low voltage differential connector from the single ended connector, the transceiver unit is configured to produce a target information signal that is indicative of transmission activity through one of the low voltage differential connector and the single ended connector, the transceiver unit being configured to prevent the second burst rate from downwardly impacting the first burst rate of the low voltage differential connector.

20. A method for making a host adapter as recited in claim 19, wherein the target information signal that is produced by the transceiver unit is further configured to signal a logical zero when the transmission activity is through the low voltage differential connector.

21. A method for making a host adapter as recited in claim 19, wherein the target information signal that is produced by the transceiver unit is further configured to signal a logical one when the transmission activity is through the single ended connector.

22. A method for making a host adapter as recited in claim 19, further comprising:

coupling a low voltage differential bus to the low voltage differential connector;

coupling a single ended bus to the single ended connector.

23. A method for making a host adapter as recited in claim 22, further comprising:

coupling a SCSI Ultra2 target device to the low voltage differential bus; and coupling a SCSI Ultra target device to the single ended bus.

24. A method for making a host adapter as recited in claim 19, further comprising:

mounting a SCSI host adapter chip to the printed circuit board, such that the target information signal is communicated to the SCSI host adapter chip.

25. A method for making a host adapter as recited in claim 24, further comprising:

mounting a crystal oscillator for providing a clock signal to the transceiver unit;

mounting a programmable logic device; and mounting a memory device for storing boot-up operating code.

26. A method for making a host adapter as recited in claim 22, wherein the host adapter is a SCSI host adapter, and the transceiver unit is capable of maintaining a first maximum burst rate for a low voltage differential target device that is connected to the low voltage differential bus, and capable of maintaining a second maximum burst rate for a single ended target device that is connected to the single ended bus.

* * * * *